July 24, 1962  W. C. JOHNSON ETAL  3,045,330
FABRICATION OF HOLLOW ARTICLES
Filed July 30, 1958
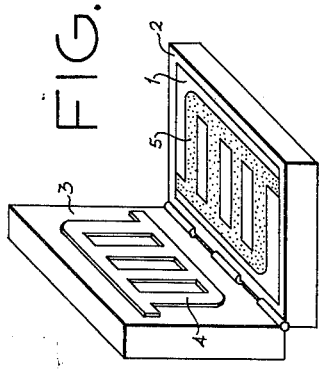
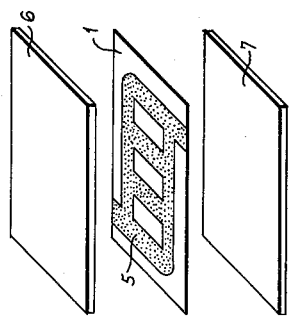
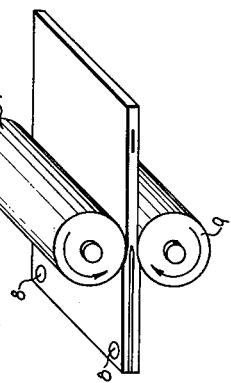
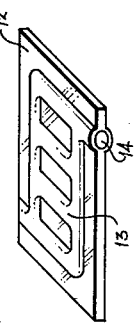
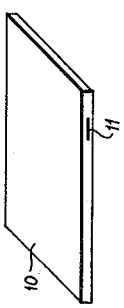
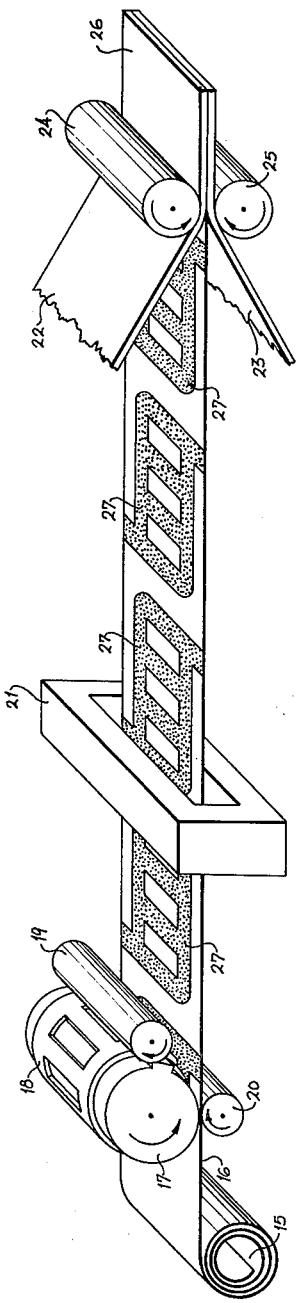
INVENTORS
WALLACE C. JOHNSON
SHELDON H. BUTT
BY Lionel E. Goff
ATTORNEY 3,045,330
FABRICATION OF HOLLOW ARTICLES
Wallace C. Johnson, Hamden, Conn., and Sheldon H. Butt, Brighton, Ill., assignors to Olin Mathieson Chemical Corporation, East Alton, Ill., a corporation of Virginia
Filed July 30, 1958, Ser. No. 752,035
12 Claims. (Cl. 29—157.3)

This invention relates to the fabrication of hollow articles and more particularly to a method of fabricating forge welded articles having unjoined inner portions.

In the well-known process of fabricating hollow panels such as refrigerator heat exchangers and the like, as fully disclosed in a patent to Grenell, U.S. 2,690,002, granted on Steptember 28, 1954, a pattern of separation material is applied to a clean surface of a sheet of metal. A clean surface of a second sheet of metal is superimposed on this surface and the two sheets are secured to prevent relative movement and are welded together by hot rolling in the adjacent areas thereof which are not separated by the separation material. Hot rolling of the sheets results in reducing the thickness of the two sheets and elongating the resultant blank in the direction of rolling while the width of the resultant blank remains substantially the same as the initial width of the sheets. Following the hot rolling operation, the resultant blank is usually softened as by annealing to make it more pliable and if desired it may then be cold rolled and again softened by annealing. The separation material results in an unjoined portion between the outer surfaces of the blank. After softening the blank, the unjoined portion is expanded by injecting therein a fluid pressure of sufficient magnitude to permanently distend the blank in the areas of the unjoined portion.

This above method is successfully employed in fabrication of various hollow articles. However, certain problems are encountered in the inherent nature of the metal sheets from which the final panel is fabricated. As is well known, sheets of any relatively thick metal, such as aluminum, copper and other metals and alloys thereof, do not have either very smooth or truly flat surfaces since irregularities always occur on the surface of such relatively thick metal sheets. These surface irregularities are further magnified or compounded after subjection to cleaning operations, such as by chemical compounds or wire brushing, required to produce clean surfaces to facilitate forge welding in the aforesaid patent. These irregularities prevent the application of uniform patterns of separation material and cause corresponding inaccuracy in the pattern of passageways formed in the resultant expanded blank. As noted above, hot rolling results in elongation of the resultant welded panel. Inherently, with the elongation of the panel, the coating of separation material is also simultaneously elongated. As can be seen, variation in thickness of the coating of separation material will also result in variations of the pattern of unjoined areas desired with resultant variations in the expanded unjoined areas. In addition the irregularities, inherent in the surface of the metal, during the rolling operation will cause reduction of the thickness of the coating separation material throughout the pattern applied. Such reduction in thickness of separation material is so severe at times that it will defeat the very purpose desired in the use of separation material. This results in partial welding of the sheets of metal at points of severe reduction, in thickness of the coating of separation material is what is known as "preferential sticking." In practice, when preferential sticking occurs during expansion of the unjoined areas it has been found to cause unevenness in the final pattern obtained and on many occasions has caused the unjoined area to burst under the pressure applied by the expanding fluid. Heretofore, the accuracy and evenness in thickness of the coating of separation material in the aforesaid process was dependent upon the skill of the operator.

In accordance with the above referred to patent, a pattern of separation material is applied to individual sheets of metal or to rolls of said sheets. When the pattern of separation material is applied to a large number of individual sheets of metal, the disadvantages in multiple manual handling are self-evident in the manipulations required by the operator. Where the pattern of separation material is applied to coils of metal required by the aforesaid process such application has the economic disadvantage in the use of heavy coiling equipment, and in the high inventory required in the storage of the coiled sheets of metal.

It has been discovered that all of the aforesaid disadvantages can be eliminated by application of the pattern of stop-weld material upon extremely thin evanescent materials which are inserted between the sheets of metal of the aforesaid patented process. Generally speaking, by way of example, such evanescent materials may be metal foils, of the order of 0.0002 inch thickness, which will completely alloy by diffusion with the aforesaid sheets of metal during forge welding wherein not only does their identity disappear but the sheets sandwiching such evanescent material are joined together in a unitary structure as in the referred to patent. The term "evanescent" materials, inclusive of foil, is hereinafter and in the claims restricted to sheets of material having a thickness sufficient to accomplish the purposes of this invention but insufficient to leave after treatment a final interfacial layer between the plies which retains its identity and causes impairment in the strength of the finished article. The specific thickness of the evanescent material will depend on its specific composition and that of the sheets of metal which encase it. Generally speaking what is contemplated is a thickness not in excess of .0002 inch.

In addition to the metal foil described above, other materials such as sheets of tissue paper and various plastics such as the vinylidene chlorides (commonly known as Saran Wrap) which during the forge welding operation lose their identity as such, during the forge welding operation of tissue paper is employed, the paper will be oxidized to carbon monoxide or dioxide leaving only an extremely small amount of ash which does not interfere with the welding processes. When the aforesaid vinylidene chloride plastic, only 0.0005 inch thick, is employed, it turns to a vapor upon heating and leaves an extremely small amount of very fine ash at 200° F. well below the temperature involved in forge welding.

When metal foils are employed, as has been pointed out, they must be characterized by their ability to alloy with the sheets of metal between which they are inserted. Specifically pure aluminum and magnesium foils may be used between sheets of aluminum wherein after the forge welding operation the foil completely loses its identity by absorption and alloying, by diffusion into the sheets of metal which are welded together into a unitary structure. When magnesium foils, which melt at about 1200° F., are employed between sheets of aluminum, an additional advantage results in that the oxidized aluminum surfaces no longer have to bond solely to each other but each bonds to each other through a different metal which is slower to oxidize and which is alloyed with each sheet of aluminum.

Such evanescent materials are characterized in that the thinness in which they are employed, they have a smooth and flat surface for the application of stop-weld material without the disadvantages characterized by the irregularities inherently present in the surface of the sheets of metal between which these evanescent materials are inserted. The flat and extremely smooth surfaces of the materials of this invention permit the application of uniform thicknesses of coatings of separation material eliminating the aforedescribed irregularities in the pattern of unjoined areas and the preferential sticking heretofore encountered. In addition, a uniform coating of separation material is now made possible without the necessity of depending on the skill of the operator, since the pattern may be applied, without consideration of the irregularities, heretofore encountered, in any convenient manner such as application through a silk screen, spraying, plating, and either in liquid, paste or powder form. In addition, these evanescent materials, make possible, because of the presence of extremely smooth surfaces, the use of conventional printing equipment employing plates such as zinc or rubber.

Further the use of the evanescent materials of this invention requires only light coiling equipment and does not involve high inventories in storage, after application of the pattern of separation material.

Accordingly, it is the object of this invention to provide a novel process for the manufacture of inflated articles eliminating certain disadvantages of the prior art.

A still another object of this invention is to provide a novel process wherein a more accurate pattern of separation material can be provided in the fabrication of hollow forge welded articles.

A further object is to provide a novel process wherein a more uniform coating of separation material can be applied in the fabrication of hollow forge welded articles.

A still further object of this invention is to provide a novel process wherein separation material can be applied in the fabrication of hollow forge welded articles without depending upon the skill of the operator.

Still another object of this invention is to provide a novel process wherein a convenient and ready source for pattern of separation material without the necessity of tying up heavy fabricating equipment.

Additional objects and advantages will become apparent in the following description and drawings in which:

FIGURE 1 is a perspective view of an embodiment of this invention of a conventional manual printing apparatus that may be employed in applying a pattern of separation material to the evanescent material of this invention.

FIGURE 2 is a perspective view of the evanescent material in FIGURE 1 having applied to it a pattern of separation material, and interposed between sheets of metal which are to be forge welded.

FIGURE 3 is a perspective view illustrating the forge welding of the assembled sheets of metal and evanescent material of FIGURE 2.

FIGURE 4 is a perspective view illustrating the sheet of FIGURE 3 in its completed form.

FIGURE 5 is a perspective view illustrating the sheet of FIGURE 4 after expansion of the unjoined areas defined by the pattern of separation material, and FIGURE 6 is a perspective view illustrating another embodiment of the invention wherein the forge welding process is continuous and the pattern of separation material is continuously applied to the evanescent material by means of a printing roll.

Referring to the drawings, FIGURE 1 shows a sheet of evanescent material 1, more fully hereinafter described, such as pure aluminum foil either 0.0001 or 0.0002 inch thick, placed on a backing table 2 to which is hinged a printing plate 3, zinc or rubber, having a raised printing area 4. Printing area 4 is formed into the configuration of a pattern of separation material desired to be imparted on sheet 1. Upon application of a suitable ink having a base prepared from separation material, from a source not shown, across raised area 4, plate 3 is closed upon backing table 2 to transfer a pattern of separation material 5 to the sheet of evanescent material 1. Pattern separation material 5 will ultimately form the passageways of the finished blank.

Any suitable separation material may form the base of the ink used above. Its chief function is to prevent welding of the coated surfaces during the welding operation. For instance, the separation material may be graphite water glass mixture, kieselguhr or other diatomaceous earths, flint, talc, powdered-quartz, clays and the like, and mixtures thereof with each other, and with graphite and water glass or the like.

Sheet 1 is then interposed, as in FIGURE 2, between metal sheets 6 and 7 of an aluminum alloy, such as 2–S or 61–S, and the components assembled into face to face contacting relationship. The assembly may then be tackled together at their four corners as by spot welding 8 to prevent relative slippage of sheets 6 and 7 during a subsequent welding operation.

Pure aluminum has been employed in the above assembly since it readily alloys with the specific aluminum alloy sheets during the welding operation wherein aluminum alloy sheets 6 and 7 are joined together into a unitary structure. In accordance with this invention any sheet of evanescent material may be used which does not prevent welding of the adjoining surfaces of the metal, not separated by separation material, between which the sheet of evanescent material is inserted. As noted above, thickness of the evanescent material at and below which this evanescent material loses its identity and does not interfere with the welding operation generally does not exceed .0002 inch. In accordance with the invention, sheet 1, above may be a sheet of tissue paper or a sheet of plastic, such as the vinylidene chlorides (commonly known as Saran Wrap), which turns to vapor and leaves an extremely small amount of very fine ash at 200° F. Sheet 1 in addition may be magnesium foil with the added advantage noted above.

When steel sheets, 6 and 7, are desired to be welded together into a unitary structure, the sheet of evanescent material inserted between sheets 6 and 7 may be zinc, tin, copper or alloys thereof which readily form alloy with steel and do not interfere with the welding operation. In like manner, sheets of copper, bronze or brass may be welded together into a unitary structure by the use of inserts of zinc foil, such as that containing 60% copper and 40% zinc, and the like. Also the welding of unitary bimetallic structures from sheets of steel and aluminum can be obtained by use of copper foil inserts in accordance with the invention.

In the use of metal foils for the inserts of the invention their capability of alloying with the outer sheets and because of their extreme thinness they readily lose their identity by diffusion and become alloyed into the unitary structure obtained by the welding operation without leaving an identifiable interfacial layer between the plys.

After the sheets 6 and 7 are tacked together to prevent relative movement, they are welded together at the surfaces not separated by the separation material. One well-known method of welding the sheets together is by hot rolling in which the sheets are first heated to about 1200° F., and then passed through mill rolls 9 between which they are reduced in thickness, about 60% reduction and elongated in the direction of rolling.

It is to be noted that in the use of evanescent materials such as the paper and plastics, above described, the paper prior to the welding of sheets 6 and 7 at this point will have lost its identity. In the paper embodiment of this invention the paper will have been oxidized to carbon monoxide and/or dioxide leaving at most, an extremely small amount of ash. On oxidation of the paper embodiment of the invention the pattern of separation material printed on the surface of the paper will be left behind and will be of uniform thickness throughout. A similar pattern of stop-weld material is left behind in the use of the aforedescribed plastics since this embodiment would have vaporized and/or oxidized during the heating of the assembly prior to rolling leaving behind a uniform and exact pattern of separation material as in the paper embodiment.

The resultant integral and unitary blank 10 is shown in FIGURE 4, and contains an unjoined inlet area 11 at its edge which is obtained by extending the pattern of separation material to the edge of sheet 1. If desired the resultant integral and unitary blank 10 having an unjoined portion may be softened in any appropriate manner as by annealing, after the forging operation the blank may be cold rolled to final dimension desired and then again annealed.

After the welding operation the resultant integral blank 10 has the unjoined portion 11 at the edge of blank 10, forced open, a suitable nozzle, not shown, for a pressure fluid is inserted into the resultant orifice, and the resultant structure is then expanded to form the hollow article 12. The expansion of the blank may be accomplished by any convenient method, as for example, the blank may be expanded after being clamped between dies having cut-out portions conforming to the configuration of the unjoined portion of the blank. Alternatively, the welded blank may be expanded between opposed flat platens such as described in U.S. Patent No. 2,835,961.

As shown in FIGURE 5 the expanded article 12 has a pattern 13 of unjoined interpasageways 14. Such a finished panel 12 may be used for various purposes, as for example, heat exchange units as in refrigerator evaporator panels. Although only the simplest pattern of separation material is shown, it is readily understood that such patterns may take any complicated shape depending upon their requirements of the design required. Accordingly, such complex patterns may be, or may include, accumulator sections, waffle designs, polka dot designs and combinations thereof.

FIGURE 6 illustrates the application of the invention to a continuous method of forge welded unitary structures from strips of metal. A continuous strip of evanescent material 16 is unwound from a coil 15 and passes between a printing roller 17, either a zinc or rubber, which contains a raised printing area 18 having a configuration of the pattern of separation material desired to be imprinted on strip 16. A roller 19 is located adjacent to printing area 18 or roller 17 and is separated therefrom only by layer of separation material which is continuously applied to roller 19 by any convenient means not shown. As a result the cooperation between rollers 19 and 17 a layer of separation material is applied to printing area 18 but not on roller 17. The surface of printing area 18 is in contact with the upper surface of strip 16. A suitable backing roller 20, which may be rubber-coated is located beneath strip 16 and in contact with the same under roller 17. Roller 20 rotates clockwise and grips the strip so as to advance the same toward the right as in FIGURE 6. The separation material on the surface of printing area 18 is thus transferred to the upper surface of the strip of evanescent material 16 thereby imprinting the desired pattern of separation material on the strip. The strip is then passed through an oven-dryer 21 which is heated by any suitable convenient means, such as radiant heat or induction coils, not shown which maintain the oven at a sufficiently high temperature to insure drying of the separation material on strip 16.

After emerging from oven 21, strip 16 passes between two outer sheets 22 and 23 which are fed from any suitable coiled source. Sheets 22 and 23 with strip 16 sandwiched between them are then passed between a pair of aligning rollers 24 and 25 from which sheets 22 and 23 are heated by passing through a conventional heating means, not shown, such as electric induction furnace or coil, and then between a pair of forge rollers, such as 9 in FIGURE 3, which weld the sheets into a unitary structure without any identifiable interfacial layer.

As noted above sheets 22 and 23 may be either aluminum, aluminum alloy, brass, steel and other metals discussed above, and the evanescent material of this embodiment may be any of the materials discussed above which do not interfere with the welding of sheets 22 and 23.

After welding of sheets 22 and 23 into a unitary strip 26, the strip may be suitably coiled for future use, or strip 26 may be severed into, individual units, between the unjoined areas defined by separation material 27 to form panels such as illustrated in FIGURE 4. Inflation of the panel into the final article of FIGURE 5 is accomplished in the manner discussed above.

It is to be noted, that after the printing step in FIGURE 6, the printed strip of foil may be wound for storage, with light coiling equipment, with a light inventory overhead. The wound printed foil forms a convenient source from which any number of patterns may be distributed as required for subsequent forge-welding operations.

Although the invention has been described with reference to specific embodiments, materials and details, various modifications and changes will be apparent to one skilled in the art and are contemplated to be embraced within the invention.

What is claimed is:

1. A method of making hollow articles by pressure welding sheets of metal at a pressure welding temperature comprising, applying a pattern of separation material to a foil of metal capable of alloying under pressure with said sheets of metal at said temperature with said foil having a thickness not in excess of about 0.0005 of an inch, forming an assembly having said foil interposed in contacting relationship between said sheets of metal, pressure welding said assembly by applying sufficient pressure to said assembly of sheets and foil at said temperature to completely alloy said foil by diffusion with said sheets of metal wherein said sheets of metal are joined into a unitary panel, and expanding the area defined by said separation material.

2. The method of claim 1 wherein said sheets of metal are selected from the group consisting of aluminum and alloys thereof, and wherein said foil has a thickness not in excess of about 0.0002 of an inch.

3. The method of claim 2 wherein said foil is substantially pure aluminum.

4. The method of claim 1 wherein each of said sheets is a diverse metal.

5. The method of claim 4 wherein one of said sheets is steel and the other is selected from the group consisting of aluminum and alloys thereof, and wherein said foil has a thickness not in excess of 0.0002 of an inch.

6. The method of claim 5 wherein said foil is substantially pure copper.

7. A method of making hollow structures by pressure welding sheets of metal at an elevated pressure welding temperature comprising, applying a pattern of separation material to a thin evanescent sheet of material having a thickness not in excess of 0.0005 of an inch, forming an assembly having said sheet of material interposed between said sheets of metal at said temperature, with said evanescent material selected from the group consisting of paper and vinylidene chloride plastics, heating said assembly to said temperature, applying sufficient pressure to said assembly of sheets at said temperature to effect welding of said sheets of metal wherein said sheet of material "loses its identity" and said sheets of metal are joined into a unitary panel, and expanding the area defined by said separation material with fluid pressure.

8. A method of making hollow metal structures by pressure welding strips of metal comprising, providing a coil of metal foil strip with recurring patterns of separation material wherein said foil is capable of alloying under pressure with said strips of metal at said temperature with said foil having a thickness not in excess of about 0.0005 of an inch, continuously interposing said foil strip from said coil between continuous strips of metal and in face-to-face contacting relationship therewith, passing said contacting strips to a welding means at said temperature and thereat applying sufficient pressure to said contacting strips at said temperature to completely alloy said strips of metal by diffusion with said interposed foil strip therebetween and wherein said strips of metal are joined into a unitary strip.

9. The method of claim 8 wherein said unitary strip of metal is severed into sheets between said patterns of separation material.

10. The method of claim 8 wherein said unitary strip of metal is coiled.

11. The method of claim 9 wherein the area defined by said pattern of separation material is expanded in said sheets.

12. A method of making hollow metal structures by pressure welding sheets of metal at a pressure welding temperature comprising, applying recurring patterns of separation material to the surface of a strip of metal foil capable of alloying under pressure with said sheets of metal at said temperature with said strip being of substantial length to accommodate said pattern a plurality of times along said length and having a thickness not exceeding substantially about 0.0005 inch, winding said strip into a coil, severing a portion of said strip from said coil in the area between adjacent patterns to provide a sheet of foil having a pattern imprinted thereon, forming an assembly having said sheet of foil interposed between said sheets of metal at said temperature, pressure welding said assembly by applying sufficient pressure to said assembly at said temperature to completely alloy said sheet of foil by diffusion with said sheets of metal wherein said sheets of metal are joined into a unitary panel, and expanding the area defined by said material with fluid pressure.

References Cited in the file of this patent

UNITED STATES PATENTS

| | | |
|---|---|---|
| 1,926,320 | Trembour | Sept. 12, 1933 |
| 2,285,424 | Fenner | June 9, 1942 |
| 2,690,002 | Grenell | Sept. 28, 1954 |
| 2,747,064 | Van Pappelendam | May 22, 1956 |
| 2,753,623 | Boessenkool et al. | July 10, 1956 |
| 2,767,467 | Siegel | Oct. 23, 1956 |
| 2,881,304 | Dobson | Apr. 7, 1959 |
| 2,906,006 | Neel | Sept. 29, 1959 |

UNITED STATES PATENT OFFICE

CERTIFICATE OF CORRECTION

Patent No. 3,045,330                       July 24, 1962

Wallace C. Johnson et al.

It is hereby certified that error appears in the above numbered patent requiring correction and that the said Letters Patent should read as corrected below.

Column 6, line 68, after "metal" insert -- at a pressure welding temperature --.

Signed and sealed this 20th day of November 1962.

(SEAL)
Attest:

ERNEST W. SWIDER
Attesting Officer

DAVID L. LADD
Commissioner of Patents